(12) United States Patent
Brandvold et al.

(10) Patent No.: US 8,754,275 B2
(45) Date of Patent: Jun. 17, 2014

(54) METHODS AND APPARATUSES FOR PRODUCING AROMATIC HYDROCARBON-RICH EFFLUENT FROM LIGNOCELLULOSIC MATERIAL

(75) Inventors: Timothy A. Brandvold, Arlington Heights, IL (US); Mark Koch, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 349 days.

(21) Appl. No.: 13/191,211

(22) Filed: Jul. 26, 2011

(65) Prior Publication Data

US 2013/0030230 A1 Jan. 31, 2013

(51) Int. Cl.
*C10G 1/00* (2006.01)

(52) U.S. Cl.
USPC ........... 585/240; 585/241; 585/242; 585/400; 585/404; 585/408; 585/469; 585/733

(58) Field of Classification Search
USPC ......... 585/240–242, 400, 404, 408, 409, 469, 585/733
See application file for complete search history.

(56) References Cited

U.S. PATENT DOCUMENTS

| | | | |
|---|---|---|---|
| 4,052,292 A | 10/1977 | Espenscheid et al. |
| 4,087,318 A | 5/1978 | Samuelson et al. |
| 4,141,786 A | 2/1979 | Eckert |
| 4,207,076 A | 6/1980 | Bove et al. |
| 4,385,193 A | 5/1983 | Bijwaard et al. |
| 4,401,561 A | 8/1983 | Thompson et al. |
| 4,420,644 A | 12/1983 | Huibers et al. |
| 4,436,586 A | 3/1984 | Elmore |
| 4,647,704 A | 3/1987 | Engel et al. |
| 4,992,605 A | 2/1991 | Craig et al. |
| 5,019,135 A | 5/1991 | Sealock, Jr. et al. |
| 5,959,167 A | 9/1999 | Shabtai et al. |
| 5,961,786 A | 10/1999 | Freel et al. |
| 7,578,927 B2 | 8/2009 | Marker et al. |
| 7,867,296 B2 | 1/2011 | Montague et al. |
| 8,063,258 B2 | 11/2011 | Bartek et al. |
| 2003/0115792 A1 | 6/2003 | Shabtai et al. |
| 2008/0050792 A1 | 2/2008 | Zmierczak et al. |
| 2008/0076945 A1 | 3/2008 | Marker et al. |
| 2008/0216391 A1 | 9/2008 | Cortright et al. |
| 2008/0312346 A1 | 12/2008 | McCall et al. |
| 2008/0312479 A1 | 12/2008 | McCall et al. |
| 2009/0253947 A1 | 10/2009 | Brandvold et al. |

(Continued)

FOREIGN PATENT DOCUMENTS

| CA | 536549 A | 1/1957 |
|---|---|---|
| WO | 2006119357 A2 | 11/2006 |

(Continued)

OTHER PUBLICATIONS

U.S. Appl. No. 13/190,751, filed Jul. 26, 2011, Chen et al.

(Continued)

*Primary Examiner* — Brian McCaig
(74) *Attorney, Agent, or Firm* — Maryann Maas

(57) ABSTRACT

Embodiments of methods and apparatuses for producing and aromatic hydrocarbon-rich effluent from a lignocellulosic material are provided herein. The method comprises the step of combining the lignocellulosic material and an aromatic hydrocarbon-rich diluent to form a slurry. Hydrogen in the presence of a catalyst is contacted with the slurry at reaction conditions to form the aromatic hydrocarbon-rich effluent.

14 Claims, 1 Drawing Sheet

(56) References Cited

U.S. PATENT DOCUMENTS

| | | | |
|---|---|---|---|
| 2009/0283442 | A1 | 11/2009 | McCall et al. |
| 2009/0294324 | A1 | 12/2009 | Brandvold et al. |
| 2009/0300971 | A1 | 12/2009 | Abhari et al. |
| 2009/0301930 | A1 | 12/2009 | Brandvold et al. |
| 2009/0326286 | A1 | 12/2009 | Yie et al. |
| 2010/0004437 | A1 | 1/2010 | Binder et al. |
| 2010/0043279 | A1 | 2/2010 | Abhari et al. |
| 2010/0137663 | A1 | 6/2010 | Chen et al. |
| 2010/0137665 | A1 | 6/2010 | Chen |
| 2010/0312027 | A1 | 12/2010 | Tsurutani et al. |
| 2011/0094147 | A1* | 4/2011 | Bartek et al. .................. 44/282 |
| 2011/0167713 | A1 | 7/2011 | Quignard et al. |
| 2011/0220053 | A1 | 9/2011 | Croft et al. |
| 2012/0005949 | A1 | 1/2012 | Stevens et al. |

FOREIGN PATENT DOCUMENTS

| | | | |
|---|---|---|---|
| WO | 2007095787 | A1 | 8/2007 |
| WO | 2009037281 | A2 | 3/2009 |
| WO | 2009108601 | A2 | 9/2009 |

OTHER PUBLICATIONS

U.S. Appl. No. 13/191,213, filed Jul. 26, 2011, Chen.

Tang, Zhel et al. "Catalytic Hydrocracking of Pyrolytic Lignin to Liquid Fuel in Supercritical Ethanol" Industrial and Engineering Chemistry Research, v 49, n 5, p. 2040-2046, Mar. 3, 2010; ISSN: 08885885, E-ISSN 15205045; DOI: 10.1021/ie9015842; Publisher: American Chemical Society.

Shabtai, J. et al. "Conversion of Lignin—2. Production of High-Octane Fuel Additives" ACS 217th National Meeting (Anaheim Mar. 21-25, 1999) ACS Division of Fuel Chemistry Preprints (ISSN 0569-3772) V44 N.2 267-72 (1999).

Thring, Ronald W. et al. "Hydrocracking of Solvolysis Lignin in a Batch Reactor" Fuel, v 75, n 7, p. 795-800, May 1996; ISSN: 00162361; DOI: 10.1016/0016-2361(96)00036-1; Publisher: Elsevier Ltd.

Jones, S.B. et al. "Production of Gasoline and Diesel from Biomass via Fast Pyrolysis, Hydrotreating and Hydrocracking: A Design Case" Department of Energy, Washington, DC.; Report: PNNL-18284, 76p, Feb. 2009.

Davis, H.G. "Direct Liquefaction of Biomass. Final Report and Summary of Effort, 1977-1983 (Wood-Derived Oils)" Department of Energy, Washington, DC.; Report: LBL-16243, 94p, Jun. 1983.

Chen, J. Q., "Methods and Apparatuses for Producing Aromatic Hydrocarbon-Containing Effluent," U.S. Appl. No. 13/191,213, filed Jul. 26, 2011.

Brandvold, T., et al., "Methods and Apparatuses for Producing Aromatic Hydrocarbon-Rich Effluent From Lignocellulosic Material," U.S. Appl. No. 13/191,211, filed Jul. 26, 2011.

Robinson, J.M. et al.; (May 2004) "The use of catalytic hydrogenation to intercept carbohydrates in a dilute acid hydrolysis of biomass to effect a clean separation from lignin"; Source: Biomass and Bioenergy, vol. 26, No. 5, pp. 472-483.

Okuda, Kazhide et al.; (Apr. 14, 2004) "Efficient conversion of lignin into single chemical species by solvothermal reaction in water-p-cresol solvent", Source: Journal of Physics Condensed Matter, vol. 16, No. 14, pp. S1325-S1330, Proceedings of the joint 19th AIRAPT and 41st EHPRG International Conference on High Pressure Science and Technology.

Johnson, D.K. et al.; (Mar. 2002) Conversion of lignin into a hydrocarbon product for blending with gasoline.; Source: ACS Division of Fuel Chemistry, Preprints, vol. 47, No. 1, pp. 380-381.

Kleinert, M. et al.; (Mar./Apr. 2008) "Towards a lignincellulosic biorefinery: Direct one-step conversion of lignin to hydrogen-enriched biofuel"; Source: Energy and Fuels; vol. 22, No. 2, pp. 1371-1379.

Fogler, H.S. (1992). Elements of Chemical Reaction Engineering, 2nd ed., Prentice Hall, 838 pages.

Meier, D.; (Sep. 29, 2008-Oct. 1, 2008) Catalytic hydrocracking of lignins to useful aromatic feedstocks.; Source: DGMK Tagungsbericht, No. 3, Conference: DGMK Tagungsbericht 2008-3—Future Feedstocks for Fuels and Chemicals, pp. 299-304, 2008.

De Wild, Paul et al.; (Oct. 2009) "Lignin valorisation for chemicals and (transportation) fuels via (catalytic) pyrolysis and hydrodeoxygenation", Source: Environmental Progress and Sustainable Energy, vol. 28, No. 3, pp. 461-469, GTI-TechBioMass.

Nagy, Mate, et al.; (Sep. 1, 2009) Catalytic hydrogenolysis of ethanol organosolv lignin.; Source: Holzforschung, vol. 63, No. 5, pp. 513-520.

Ye, Jie-Wang et al.; (Mar. 2006) "Hydrogenation of straw alkali lignin catalysed by Pd/C catalyst"; Source: Zhongguo Xuebao/Transactions of China Pulp and Paper, vol. 21, No. 1, pp. 73-76; Language: Chinese.

Bridgwater, A.V.; (2004) "Biomass Fast Pyrolysis"; Source: Review paper Biblid: 0354-9836, vol. 8, No. 2, pp. 21-49.

* cited by examiner

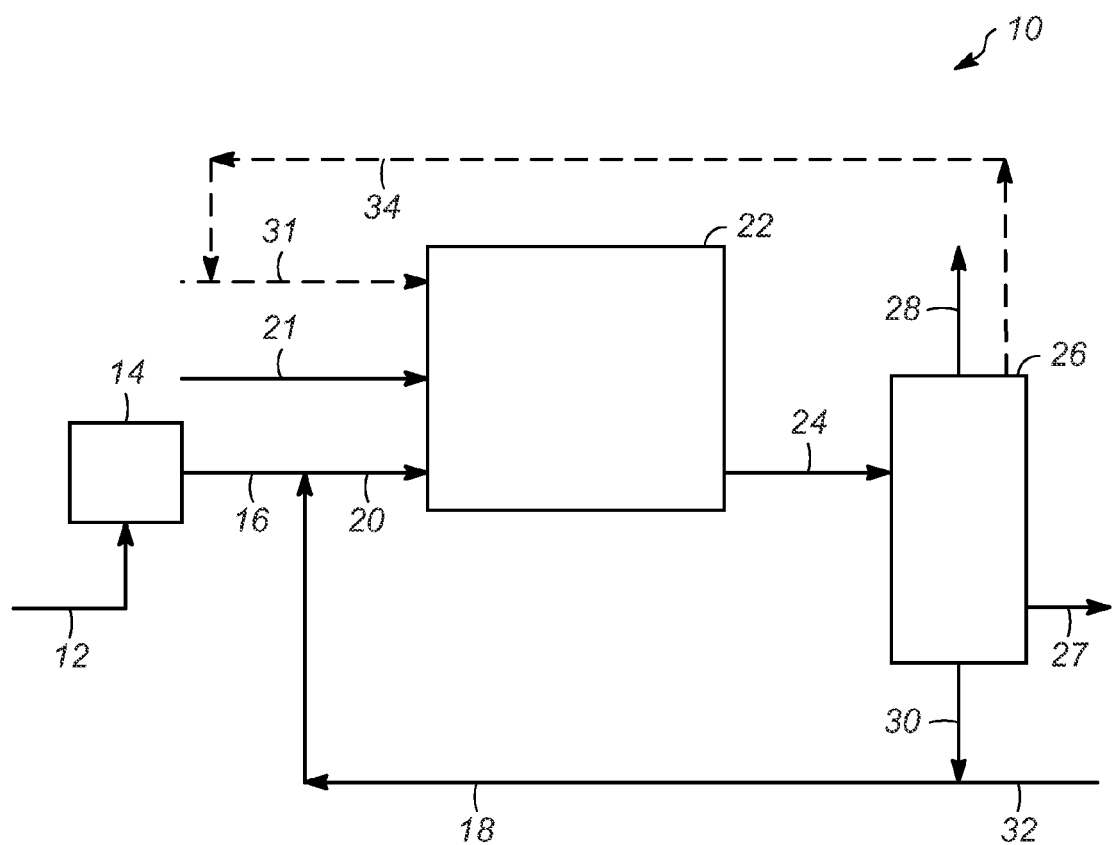

METHODS AND APPARATUSES FOR PRODUCING AROMATIC HYDROCARBON-RICH EFFLUENT FROM LIGNOCELLULOSIC MATERIAL

FIELD OF THE INVENTION

The present invention relates generally to methods and apparatuses for producing biofuels, and more particularly to methods and apparatuses for producing aromatic hydrocarbon-rich effluent from lignocellulosic material.

BACKGROUND OF THE INVENTION

Emphasis on renewable energy sources has been increasing, for example, due to concerns for reducing fossil fuel greenhouse gas emissions, reducing dependence on imported oil, providing a substitute for fossil fuels, and providing basic chemical constituents to be used in other industries, such as chemical monomers for making plastics and the like. Lignocellulosic material represents a vast amount of renewable resources available in virtually every part of the world and has the potential to satisfy at least some of the needs for sources of fuels and chemicals.

Lignocellulosic material is biomass that contains lignin and cellulose. Lignocellulosic material includes, but is not limited to, wood, forestry waste, sawdust, straw, corn stover, sugarcane bagrasse, switchgrass, and other lignin and cellulose containing materials of biological origin. Lignin bonds to the cellulose and has a molecular structure of a cross-linked phenolic polymer having an abundance of aromatic rings. Lignin is generally present in lignocellulosic material in an amount of about 15 to about 30 percent by weight.

Lignocellulosic material when heated to about 300 to about 900° C. in the absence of air forms solid products, liquid products, and gaseous pyrolysis products. A condensable portion (vapors) of the gaseous pyrolysis product is condensed into biomass-derived pyrolysis oil. Biomass-derived pyrolysis oil is a complex, highly oxygenated organic liquid having properties that currently limit its direct utilization as a biofuel or as a basic chemical constituent. Conversion of biomass-derived pyrolysis oil into an aromatic hydrocarbon-rich product that is useful as a biofuel and/or a basic chemical constituent requires additional operations to fully or partially deoxygenate the biomass-derived pyrolysis oil. These additional operations are expensive and time-consuming.

Accordingly, it is desirable to provide methods and apparatuses for converting lignocellulosic material into an aromatic hydrocarbon-rich product that may be used as a biofuel and/or a basic chemical constituent. In addition, it is also desirable to provide methods and apparatuses for producing an aromatic hydrocarbon-rich product directly from lignocellulosic material without requiring additional operations that are expensive and time-consuming to fully or partially deoxygenate the product. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Methods and apparatuses for producing an aromatic hydrocarbon-rich effluent from a lignocellulosic material are provided herein. In accordance with an exemplary embodiment, a method for producing an aromatic hydrocarbon-rich effluent from a lignocellulosic material comprises the steps of combining the lignocellulosic material and an aromatic hydrocarbon-rich diluent to form a slurry. Hydrogen in the presence of a catalyst is contacted with the slurry at reaction conditions to form the aromatic hydrocarbon-rich effluent.

In accordance with another exemplary embodiment, a method for producing an aromatic hydrocarbon-rich effluent from a lignocellulosic material is provided. The method comprises the steps of combining a first portion of a finely ground lignocellulosic material and an aromatic hydrocarbon-rich diluent to form a first slurry. The first slurry is reacted in the presence of a catalyst pressurized under hydrogen at reaction conditions to form a first aromatic hydrocarbon-rich effluent. A second portion of the finely ground lignocellulosic material and at least a portion of the first aromatic hydrocarbon-rich effluent are combined to form a second slurry. The second slurry is reacted in the presence of the catalyst pressurized under hydrogen at the reaction conditions to form a second aromatic hydrocarbon-rich effluent.

In accordance with another exemplary embodiment, an apparatus for producing an aromatic hydrocarbon-rich effluent from a lignocellulosic material is provided. The apparatus comprises a reactor configured to contain a catalyst and a slurry that comprises the lignocellulosic material and an aromatic hydrocarbon-rich diluent. The reactor is configured to receive hydrogen and to contact hydrogen with the slurry at reaction conditions in the presence of the catalyst to form the aromatic hydrocarbon-rich effluent.

BRIEF DESCRIPTION OF THE DRAWINGS

Embodiments of the present invention will hereinafter be described in conjunction with the following drawing figures, wherein like numerals denote like elements, and wherein:

FIG. 1 schematically illustrates an apparatus for producing an aromatic hydrocarbon-rich effluent from a lignocellulosic material in accordance with an exemplary embodiment.

DETAILED DESCRIPTION

The following Detailed Description is merely exemplary in nature and is not intended to limit the invention or the application and uses of the invention. Furthermore, there is no intention to be bound by any theory presented in the preceding Background of the Invention or the following Detailed Description.

Various embodiments contemplated herein relate to methods and apparatuses for producing an aromatic hydrocarbon-rich effluent from a lignocellulosic material. Unlike the prior art, the exemplary embodiments taught herein form a slurry by combining the lignocellulosic material, which is preferably finely ground, with an aromatic hydrocarbon-rich diluent. The aromatic hydrocarbon-rich diluent comprises at least a significant fraction of aromatic hydrocarbons, such as single ring aromatic compounds, e.g., benzene, toluene, xylene, and the like, and/or fused ring aromatic compounds, e.g., tetralin and the like, and their alkylated derivatives. Hydrogen in the presence of a catalyst is contacted with the slurry at reaction conditions to form an aromatic hydrocarbon-rich effluent. The catalyst in the presence of hydrogen promotes the depolymerization and deoxygenation of the lignocellulosic material to produce an effluent that contains water and aromatic hydrocarbons (i.e. aromatic hydrocarbon-rich effluent). Preferably, the aromatic hydrocarbon-rich diluent has the capacity to facilitate hydrogen transfer in the reaction medium. Without being bound by theory, it is believed that the hydrogen transfer functionality of the aromatic hydrocarbon-rich diluent facilitates formation of the aromatic hydrocarbon-rich effluent while limiting detrimental coke formation and/or re-polymerization reactions that limit conversion and reduce product yields, as well as shorten catalyst life. In an exemplary embodiment, the conversion of the lignocellulosic material is about 95% or greater with about 85% or greater selectivity towards forming aromatic hydrocarbons to produce the effluent that is rich in aromatic hydrocarbons and may be used directly as a biofuel and/or as a basic chemical constituent with little or no additional operations required to fully or partially deoxygenate the effluent.

Referring to FIG. 1, a schematic depiction of an apparatus 10 for producing an aromatic hydrocarbon-rich effluent from a lignocellulosic material in accordance with an exemplary embodiment is provided. A feed stream 12 containing lignocellulosic material is provided to the apparatus 10. The lignocellulosic material can be any biomass that contains lignin and cellulose, such as, for example, hardwood, softwood, hardwood or softwood bark, wood chips, energy crops, agricultural residues, plant wastes or plant-derived wastes, switchgrass, corn stover, wheat straw, miscanthus, short rotation forestry products including alder, ash, southern beech, birch, eucalyptus, poplar, willow, paper mulberry, Australian blackwood, sycamore, and varieties of paulownia elongate, algae, and organic waste materials including sawdust, waste paper, waste construction materials, demolition materials, and the like.

The feed stream 12 is introduced to a milling device 14 to form a finely ground feed stream 16. The milling device 14 may be any device known to those skilled in the art capable of milling or grounding biomass into particles. In an exemplary embodiment, the lignocellulosic material is finely ground via the milling device 14 to an average particle size of from about 0.05 to about 10 mm to form the finely ground feed stream 16. Alternatively, although the apparatus 10 preferably includes the milling device 14 to facilitate the subsequent formation of a slurry suspension of the lignocellulosic material as described below, it is to be understood that the apparatus 10 may operate in accordance with embodiments contemplated herein without the milling device 14 and that the feed stream 12 may be advanced downstream without being reduced to a fine particle size.

A solvent-containing stream 18 comprising an aromatic hydrocarbon-rich diluent is introduced to the finely ground feed stream 16. The aromatic hydrocarbon-rich diluent is combined with the finely ground feed stream 16 to form a slurry 20 that preferably contains the finely ground lignocellulosic material suspended in the aromatic hydrocarbon-rich diluent. In an exemplary embodiment, the aromatic hydrocarbon-rich diluent comprises at least about 50 weight percent (wt. %) of aromatic hydrocarbons, preferably at least about 80 wt. %, and more preferably at least about 95 wt. % of aromatic hydrocarbons. In one embodiment, the aromatic hydrocarbons are substantially $C_7$ to $C_{10}$ aromatic hydrocarbons. As used herein, $C_x$ aromatic hydrocarbons means aromatic hydrocarbon molecules that have "X" number of carbon atoms. In another embodiment, the aromatic hydrocarbons are substantially $C_7$ to $C_9$ aromatic hydrocarbons. Preferably, the finely ground feed stream 16 and the solvent-containing stream 18 are combined to form the slurry 20 having a weight ratio of from about 1:2 to about 1:20 of the lignocellulosic material to the aromatic hydrocarbon-rich diluent.

A hydrogen-containing stream 21 and the slurry 20 are introduced to a reactor 22. Although the slurry 20 is shown as being formed upstream from the reactor 22, it is to be understood that the finely ground feed stream 16 and the solvent-containing stream 18 may be introduced separately to the reactor 22 to form the slurry 20 inside of the reactor 22. The reactor 22 may be an ebullated bed reactor that contains catalyst (e.g., catalyst preloaded into the reactor 22 via line 31). Alternatively, the reactor 22 may be a slurry reactor where the catalyst moves through the reactor 22 as a moving bed. In the latter case, the solvent-containing stream 18 preferably contains the catalyst, which is incorporated into the finely ground feed stream 16 and introduced to the reactor 22 together with the slurry 20.

In the reactor 22, the lignocellulosic material and the aromatic hydrocarbon-rich diluent from the slurry 20 contact hydrogen from the hydrogen-containing stream 21 in the presence of the catalyst under conditions that promote the depolymerization of the lignocellulosic material to aromatic oxygenated substitutes (e.g., phenol and its alkoxylated derivatives) and the deoxygenation (and to a lesser extent decarboxylation) of these substitutions or intermediates to aromatic hydrocarbons, forming an aromatic hydrocarbon-rich effluent 24. The catalyst may be in the form of solid particles comprising catalytically active metal disposed on a support as described below.

The reaction conditions in the reactor 22 for the catalytic depolymerization and deoxygenation of the lignocellulosic material can be adjusted depending on the quality of the lignocellulosic material to improve the level of conversion to aromatic hydrocarbons. In an exemplary embodiment, reaction conditions include a temperature of from about 40° C. to about 700° C., and preferably of from about 200° C. to about 600° C., and a hydrogen partial pressure of from about 700 kPa to about 21 MPa, and preferably of from about 3.6 MPa to about 10.5 MPa.

In addition to the reaction conditions, the residence time of the slurry 20 in contact with the hydrogen-containing stream 21 in the presence of the catalyst can also be adjusted depending on the quality of the lignocellulosic material to improve the level of conversion of the lignocellulosic material to aromatic hydrocarbons. In particular, lower residence times are associated with lower levels of conversion of the lignocellulosic material to aromatic hydrocarbons. The inverse of the residence time is related to a variable known as the Weight Hourly Space Velocity (WHSV, expressed in units of $hr^{-1}$), which is the weight flow rate of the lignocellulosic material component of the slurry 20 (absent any catalyst) divided by the catalyst weight. Increasing the WHSV, or the flow rate of the slurry 20 processed over a given quantity of catalyst, directionally decreases residence time and consequently the extent of the depolymerization and deoxygenation conversion reactions. In an exemplary embodiment, the lignocellulosic material WHSV is from about 0.1 $hr^{-1}$ to about 20 $hr^{-1}$, and preferably from about 0.5 $hr^{-1}$ to about 10 $hr^{-1}$. The quantity of hydrogen used may be based on the stoichiometric amount needed to completely convert the oxygen present in the lignocellulosic material to $H_2O$. Preferably, the reaction is carried out in the presence of hydrogen in an amount of from about 90% to about 600% of the stoichiometric amount.

In an exemplary embodiment, the catalyst has a hydrogenation function that in the presence of hydrogen promotes the deoxygenation of the lignocellulosic material and its depolymerized substitutions to produce aromatic hydrocarbons and water. The hydrogenation function is generally a catalytic metal that may be noble or non-noble.

Preferred catalysts include those comprising at least one Group VIII metal that represent a hydrogenation function, such as iron, cobalt, and nickel (e.g., cobalt and/or nickel) and/or at least one Group VI metal, such as molybdenum and tungsten. Noble metals, such as ruthenium, palladium, and platinum, may also represent the hydrogenation function. A representative hydrogenation function is therefore represented by ruthenium, platinum, palladium, iron, cobalt, nickel, molybdenum, tungsten, or mixtures thereof.

A Group VIII metal, when used, is typically present in the catalyst in an amount of from about 2 to about 25 wt. %, and normally from about 4 to about 20 wt. %, based on the volatile-free catalyst weight. A Group VI metal is preferably present in an amount of from about 1 to about 25 wt. %, and more preferably from about 2 to about 25 wt. %, also based on the volatile-free catalyst weight. A volatile-free catalyst sample may be obtained by subjecting the catalyst to drying at about 200 to about 350° C. under an inert gas purge or vacuum for a period of time (e.g., about 2 hours), so that water and other volatile components are driven from the catalyst. The hydrogenation function may be disposed on a high surface area support material such as a refractory inorganic oxide (e.g., silica, alumina, titania, and/or zirconia). A carbon support may also be used. A preferred catalyst comprises nickel, cobalt, tungsten, molybdenum, or mixtures thereof, deposited on any of these support materials, or combinations of support materials.

In an exemplary embodiment, the catalyst has both a hydrogenation function, as described above, and an acid function, which is generally a support material that imparts acidity to the catalyst. Acidity may be determined, for example, in units of millimoles of acid sites per gram of catalyst by a temperature programmed desorption (TPD) of a quantity of ammonia, from an ammonia-saturated sample of the catalyst, over a temperature of from about 275° C. to about 500° C., which is beyond the temperature where the ammonia is physisorbed. The quantity of acid sites corresponds to the number of moles of ammonia that is desorbed in this temperature range. Representative acid functions include acidic support materials for the hydrogenation function, and such support materials may be used as the entire, solid catalyst support or otherwise may be incorporated (e.g., by blending) into a relatively non-acidic support (e.g., silica or high Si/Al ratio zeolite) to impart acidity. Some acid functions may otherwise be used as binders (e.g., of zeolite crystallites) and/or fillers in an overall catalyst composition. Representative acidic support materials that can serve as the acid function include clays (e.g., minugel, kaolin, kaolinites, halloysite, and the like), zeolites, non-zeolitic molecular sieves, mixed metal oxides, sulfated zirconia, and other materials that contain acid sites and that can be used in varying amounts to regulate the overall acidity of the catalyst.

In an exemplary embodiment, the aromatic hydrocarbon-rich effluent 24 has an organic oxygen content that is less than about 20%, and preferably less than about 10% of the oxygen content of the lignocellulosic material in the finely ground feed stream 16. Oxygen originally present in the lignocellulosic material is converted, to a large extent, to water from the deoxygenation of the lignocellulosic material and to a lesser extent, to carbon monoxide and carbon dioxide from the decarboxylation of the lignocellulosic material. Accompanying the decrease in oxygen is an increase in the heating or fuel value, on a mass basis, of the aromatic hydrocarbon-rich effluent 24. In an exemplary embodiment, the conversion of the lignocellulosic material is about 95% or greater with about 85% or greater selectivity towards forming aromatic hydrocarbons to produce the aromatic hydrocarbon-rich effluent 24 that may be used directly as a biofuel and/or as a basic chemical constituent preferably with little or no additional operations required to fully or partially deoxygenate the effluent.

As illustrated, the aromatic hydrocarbon-rich effluent 24 is passed along to a separation zone 26. The separation zone 26 may be configured to perform any number of possible separation and/or purification steps including flash separation, distillation, and the like. Water, carbon monoxide, carbon dioxide, and/or other impurities are removed from the aromatic hydrocarbon-rich effluent 24 to form a treated aromatic hydrocarbon-rich effluent that may be removed from the apparatus 10 along line 27. The water, carbon monoxide, carbon dioxide, and/or other impurities are passed along line 28.

In an exemplary embodiment, at least a portion of the treated aromatic hydrocarbon-rich effluent is passed along line 30 to be recycled back to form additional slurry 20 with the finely ground feed stream 16. As illustrated, the treated aromatic hydrocarbon-rich effluent along line 30 may be combined with a fresh aromatic hydrocarbon-rich diluent stream 32 to form the solvent-containing stream 18. Alternatively, the treated aromatic hydrocarbon-rich effluent along line 30 may form the entire solvent-containing stream 18. Preferably, if the aromatic hydrocarbon-rich effluent contains any catalyst, the catalyst is separated via the separation zone 26 and passed along line 30 with the treated aromatic hydrocarbon-rich effluent to be recycled back to the reactor 22. Alternatively, the catalyst may be separated via the separation zone 26 and passed along line 34 to be recycled back to the reactor 22 along line 31.

The following is an example of the conversion of a lignocellulosic material to an aromatic hydrocarbon-rich effluent. The example is provided for illustration purposes only and is not meant to limit the various embodiments contemplated herein in any way.

Example

A 500 mL autoclave reactor was charged with 30 g of a finely ground woody biomass. The composition of the biomass comprised carbon in an amount of about 47 wt. %, hydrogen in an amount of about 6 wt. %, and oxygen in an amount of about 45 wt. %. About 123.5 g of toluene and about 6 g of a hydrocracking catalyst were added to the reactor. The hydrocracking catalyst comprised sulfided nickel and tungsten disposed on a silica-alumina support. The reactor was sealed and pressurized with about 3,650 kPa of hydrogen. The reactor was heated with stirring to a temperature of about 390° C. The reactor was maintained at that temperature for about 4 hours and was then cooled to room temperature, vented to 1 atmosphere, and opened. The solids, e.g., catalyst, etc., were collected by filtration. The resulting liquid effluent consisted of two phases, an upper aromatic hydrocarbon-rich phase and a lower aqueous phase. The upper aromatic hydrocarbon-rich phase had about 0.4 wt. % of oxygen, indicating about 96% or greater deoxygenation of the biomass feedstock.

Accordingly, methods and apparatuses for producing an aromatic hydrocarbon-rich effluent from a lignocellulosic material have been described. Unlike the prior art, the exemplary embodiments taught herein form a slurry by combining the lignocellulosic material with an aromatic hydrocarbon-rich diluent. The aromatic hydrocarbon-rich diluent comprises at least a significant fraction of aromatic hydrocarbons. Hydrogen in the presence of a catalyst is contacted with the slurry at reaction conditions to form an aromatic hydrocarbon-rich effluent. The catalyst in the presence of hydrogen promotes the depolymerization and deoxygenation of the lignocellulosic material to produce an effluent that contains water and aromatic hydrocarbons (i.e. aromatic hydrocarbon-rich effluent). In an exemplary embodiment, the conversion of the lignocellulosic material is about 95% or greater with about 85% or greater selectivity towards forming aromatic hydrocarbons to produce the effluent that is rich in aromatic hydrocarbons and may be used directly as a biofuel and/or as a basic chemical constituent with little or no additional operations required to fully or partially deoxygenate the effluent.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

What is claimed is:

1. A method for producing an aromatic hydrocarbon-rich effluent from a lignocellulosic material, the method comprising the steps of:
    combining a first portion of a finely ground lignocellulosic material and an aromatic hydrocarbon-rich diluent to form a first slurry;
    reacting the first slurry in the presence of a catalyst pressurized under hydrogen at reaction conditions to form a first aromatic hydrocarbon-rich effluent;
    combining a second portion of the finely ground lignocellulosic material and at least a portion of the first aromatic hydrocarbon-rich effluent to form a second slurry; and
    reacting the second slurry in the presence of the catalyst pressurized under hydrogen at the reaction conditions to form a second aromatic hydrocarbon-rich effluent.

2. The method according to claim 1, wherein the finely ground lignocellulosic material has an average particle size of from about 0.05 to about 10 mm.

3. The method according to claim 1, wherein the first portion of the finely ground lignocellulosic material and the aromatic hydrocarbon-rich diluent is combined at a weight ratio of from about 1:2 to about 1:20 of the lignocellulosic material to the aromatic hydrocarbon-rich diluent.

4. The method according to claim 1, wherein the reacting steps are at conditions that include a temperature of from about 200 to about 600° C.

5. The method according to claim 1, wherein the reacting steps are at conditions that include a hydrogen partial pressure of from about 700 to about 21,000 kPa.

6. The method according to claim 1, wherein the reacting steps include a finely ground lignocellulosic material weight hourly space velocity of from about 0.1 to about 20 $hr^{-1}$.

7. The method according to claim 1, further comprising the step of milling the lignocellulosic material to form the finely ground lignocellulosic material.

8. The method according to claim 7, wherein the step of milling includes forming the finely ground lignocellulosic material having an average particle size of from about 0.05 to about 10 mm.

9. The method according to claim 1, wherein the aromatic hydrocarbon-rich diluent comprises at least about 50 wt. % aromatic hydrocarbons, and wherein the first aromatic hydrocarbon-rich effluent comprises at least about 50 wt. % aromatic hydrocarbons.

10. The method according to claim 1, wherein the aromatic hydrocarbon-rich diluent comprises at least about 50 wt. % of $C_7$ to $C_{10}$ aromatic hydrocarbons, and wherein the first aromatic hydrocarbon-rich effluent comprises at least about 50 wt. % of $C_7$ to $C_{10}$ aromatic hydrocarbons.

11. The method according to claim 1, wherein the step of reacting includes contacting hydrogen with the first slurry in the presence of the catalyst that has both a hydrogenation function and an acid function.

12. The method according to claim 11, wherein the hydrogenation function is a catalytic metal selected from the group consisting of ruthenium, platinum, palladium, iron, cobalt, nickel, molybdenum, tungsten, and mixtures thereof.

13. The method according to claim 11, wherein the acid function is selected from the group consisting of a clay, a zeolite, a non-zeolite molecular sieve, a mixed metal oxide, sulfated zirconia, and mixtures thereof.

14. The method according to claim 1, wherein the step of reacting includes contacting hydrogen with the first slurry at the reaction conditions that include a temperature of from about 200 to about 600° C., a hydrogen partial pressure of from about 700 to about 21,000 kPa, and a lignocellulosic material weight hourly space velocity of from about 0.1 to about 20 $hr^{-1}$.

* * * * *